United States Patent
Gao et al.

(10) Patent No.: US 12,129,905 B2
(45) Date of Patent: Oct. 29, 2024

(54) HYBRID DAMPING MODULE, VIBRATION SUPPRESSION DEVICE, VIBRATION SUPPRESSION METHOD, AND WIND TURBINE SET

(71) Applicant: BEIJING GOLDWIND SCIENCE & CREATION WINDPOWER EQUIPMENT CO., LTD., Beijing (CN)

(72) Inventors: Yang Gao, Beijing (CN); Zhihong Zhang, Beijing (CN); Zhiliang Xu, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 77 days.

(21) Appl. No.: 17/997,221

(22) PCT Filed: Dec. 2, 2020

(86) PCT No.: PCT/CN2020/133399
§ 371 (c)(1),
(2) Date: Oct. 26, 2022

(87) PCT Pub. No.: WO2022/000989
PCT Pub. Date: Jan. 6, 2022

(65) Prior Publication Data
US 2023/0160455 A1    May 25, 2023

(30) Foreign Application Priority Data

Jun. 29, 2020 (CN) .......................... 202010606894.4

(51) Int. Cl.
*F16F 15/03* (2006.01)
*F16F 15/027* (2006.01)

(52) U.S. Cl.
CPC ............ *F16F 15/03* (2013.01); *F16F 15/027* (2013.01)

(58) Field of Classification Search
CPC ...... F16F 15/03; F16F 15/027; F16F 15/0235; Y02E 10/72
See application file for complete search history.

(56) References Cited

U.S. PATENT DOCUMENTS

| 2,622,707 A | * | 12/1952 | Faus | ...................... G01D 11/10 |
| | | | | 74/29 |
| 9,234,505 B2 | * | 1/2016 | Jensen | ...................... F03D 9/25 |
| 2017/0339752 A1 | | 11/2017 | Yamaguchi et al. | |

FOREIGN PATENT DOCUMENTS

| CN | 1002287342 A | 12/2011 |
| CN | 102852732 A | 1/2013 |

(Continued)

OTHER PUBLICATIONS

The International Search Report mailed Mar. 25, 2021; PCT/CN2020/133399.

(Continued)

*Primary Examiner* — Vishal R Sahni (57) ABSTRACT

A hybrid damping module, a vibration suppression device, a vibration suppression method and a wind turbine are provided. The hybrid damping module includes a first damping unit and second damping unit. The first damping unit includes a rotor portion and a stator portion provided parallel to the rotor portion. The rotor portion is configured to rotate relative to the stator portion so as to generate electromagnetic damping. A flow passage is formed in at least one of the rotor portion and the stator portion. The second damping unit includes a liquid damper. The liquid damper communicates with the flow passage and forms a circulation loop, and a liquid in the liquid damper can cyclically flow in the circulation loop.

20 Claims, 7 Drawing Sheets (56) References Cited

FOREIGN PATENT DOCUMENTS

| | | | |
|---|---|---|---|
| CN | 103001450 A | | 3/2013 |
| CN | 103967608 A | | 8/2014 |
| CN | 105066423 A | * | 11/2015 |
| CN | 204851548 U | | 12/2015 |
| CN | 105240451 A | | 1/2016 |
| CN | 105672514 A | | 6/2016 |
| CN | 107079537 A | | 8/2017 |
| CN | 107268822 A | | 10/2017 |
| CN | 107289061 A | * | 10/2017 |
| CN | 207315575 A | | 5/2018 |
| CN | 207315575 U | * | 5/2018 |
| CN | 109578228 A | | 4/2019 |
| CN | 109826903 A | * | 5/2019 |
| CN | 110273972 A | | 9/2019 |
| CN | 110761951 A | | 2/2020 |
| CN | 110985589 A | * | 4/2020 ........... F16D 63/002 |
| CN | 111236461 A | | 6/2020 |
| CN | 111237133 A | | 6/2020 |
| CN | 111692273 A | | 9/2020 |
| EP | 2884095 A1 | * | 6/2015 ............... F03D 1/00 |
| FR | 2489939 A1 | | 3/1982 |
| JP | 2002153036 A | | 5/2002 |
| JP | 2010195270 A | | 9/2010 |
| WO | WO-2018150508 A1 | * | 8/2018 ........... F04D 17/122 |

OTHER PUBLICATIONS

The First Chinese Office Action dated Feb. 20, 2021; Appln. No. 202010606894.4.
Extended European Search Report dated Sep. 12, 2023; Appln. No. 20943127.9.
The First Australian Examination Report dated Oct. 28, 2022; Appln. No. 2020456546.
The First Chilean Office Action dated Jan. 15, 2024; Appln. No. 202203471.

* cited by examiner

HYBRID DAMPING MODULE, VIBRATION SUPPRESSION DEVICE, VIBRATION SUPPRESSION METHOD, AND WIND TURBINE SET

This application is the National Stage of International Application No. PCT/CN2020/133399, titled "HYBRID DAMPING MODULE, VIBRATION SUPPRESSION DEVICE, VIBRATION SUPPRESSION METHOD, AND WIND TURBINE SET," filed Dec. 2, 2020, which claims the benefit of and priority to Chinese Patent Application No. 202010606894.4, titled "HYBRID DAMPING MODULE, VIBRATION SUPPRESSION DEVICE, VIBRATION SUPPRESSION METHOD, AND WIND TURBINE SET," filed Jun. 29, 2020, the entireties of which are hereby incorporated herein by reference.

FIELD

The present application relates to the technical field of wind power generation, and in particular to a hybrid damping module for suppressing vibration, a vibration suppression device, a vibration suppression method and a wind turbine.

BACKGROUND

Wind turbines are green energy devices that convert wind energy into electrical energy, which can be roughly divided into onshore wind turbines and offshore wind turbines. The external environment for a wind turbine, whether it is an onshore wind turbine or an offshore wind turbine, is complex and uncertain. These factors constitute various excitation sources in the operation of the wind turbine, which includes external excitation sources (such as uncertain external wind loads, wave loads without regular patterns, etc.) and self-excitation sources (such as the imbalance of the impeller itself, the rotation of the impeller itself, etc.).

The entry of these excitation sources may cause various uncertainties and abnormal performance of the operating characteristics of the wind turbine, and the most intuitive response is the vibration of the wind turbine. For example, under the action of an external excitation source, vibration (such as swing) of the wind turbine in a front-rear direction and left-right direction may be caused. Such vibration directly affects the stability and safety of the operation of the wind turbine, and may cause the wind turbine to start shutdown protection when the vibration is relatively large, resulting in loss of power generation.

Therefore, a vibration suppression device is to be provided, to suppress the vibration of the wind turbine due to the complex and variable external and internal excitation sources, so as to ensure the continuous and reliable operation of the wind turbine and reduce the loss of power generation caused by the shutdown of the wind turbine.

SUMMARY

Therefore, an object according to the present application is to provide a novel hybrid damping module for suppressing vibration, a vibration suppression device, a vibration suppression method and a wind turbine, so as to solve the problem of power generation loss due to shutdown caused by vibration of the wind turbine.

According to one aspect of the present application, a hybrid damping module is provided, which includes a first damping unit, where the first damping unit includes a rotor portion and a stator portion arranged in parallel with the rotor portion, the rotor portion is configured to be rotatable relative to the stator portion to generate electromagnetic damping, and a flow passage is formed in at least one of the rotor portion and the stator portion; and a second damping unit, where the second damping unit includes a liquid damper, the liquid damper is in communication with the flow passage to form a circulation loop, and a liquid in the liquid damper is configured to circulate in the circulation loop.

According to another aspect of the present application, a vibration suppression device is provided, which includes the above hybrid damping module, a suspension device, a swing rod and a mass block, where the mass block is connected to the suspension device through the swing rod, so that the swing rod drives the mass block to swing, a first end of the hybrid damping module is connected to the mass block, and a second end of the hybrid damping module is connected to a vibration device to be vibration-suppressed.

According to yet another aspect of the present application, a wind turbine is provided, which includes the above vibration suppression device and a tower, where the vibration suppression device is arranged in the tower, and the second end of the hybrid damping module is connected to an inner wall of the tower.

According to still another aspect of the present application, a vibration suppression method using the above hybrid damping module is provided, which includes measuring a current temperature value of the first damping unit; and controlling the liquid to circulate in the circulation loop in a case that the measured current temperature value of the first damping unit is greater than a first temperature threshold.

In the hybrid damping module according to the embodiments of the present application, the vibration suppression effect of the hybrid damping module is improved by the combination use of the first damping unit and the second damping unit. In addition, in the hybrid damping module according to the embodiments of the present application, the cooling flow passage is configured in the first damping unit, and the connecting pipeline is provided between the first damping unit and the second damping unit, so that the damping liquid in the second damping unit flows through the cooling flow passage of the first damping unit as a circulating cooling medium, and the flow rate of the damping liquid is dynamically adjusted according to the real-time temperature of the first damping unit, so as to realize the automatic, efficient and energy-saving cooling and heat dissipation of the second damping unit, which solves the problems of demagnetization and the attenuation of damping force of the first damping unit caused by the temperature rise. With the technical solutions, the problems of complex structure and high cost caused by providing additional cooling equipment for the permanent magnet eddy current damping device are solved, interaction and coordination between the permanent magnet eddy current damping device and the tuned liquid damper are realized, which gives full play to the advantages of the two types of dampers, and thus realizing synergistic compound vibration suppression by linkage between the TMD (Tuned Mass Damper) and the TLD (Tuned liquid Damper) while the demagnetization or the attenuation of damping force of the TMD due to over temperature is avoided by means of using the TLD to optimize and enhance the working performance of the TMD.

BRIEF DESCRIPTION OF THE DRAWINGS

The above and other objects and features of the present application will become clearer through the following description of the embodiments in conjunction with the drawings. In the drawings.

Reference numerals in the drawings:

| 1   | hub,                      | 2   | blade,                  |
|-----|---------------------------|-----|-------------------------|
| 3   | generator,                | 4   | nacelle,                |
| 5   | tower,                    | 6   | suspension device,      |
| 7   | swing rod,                | 8   | first damping unit,     |
| 9   | connecting pipeline,      | 10  | second damping unit,    |
| 11  | elastic member,           | 12  | mass block,             |
| 13  | suspension platform,      | 14  | frequency modulation platform, |
| 8a  | rotor portion,            | 8b  | stator portion,         |
| 8c  | rotating shaft,           | 8b1 | stator support disk,    |
| 8b2 | magnet,                   | 8b3 | outer side flow passage,|
| 8b4 | intermediate flow passage,| 8b5 | inner side flow passage,|
| 8b6 | liquid inlet,             | 8b7 | liquid outlet,          |
| 10a | first valve,              | 10b | circulating pump,       |
| 10c | second valve,             | 10d | pressure sensor,        |
| 10e | buffer tank,              | 10f | first temperature sensor,|
| 10g | second temperature sensor,| 10h | third valve,            |
| 10m | filter,                   | 10n | container,              |
| 10p | liquid,                   | 10r | heat dissipation fin,   |
| 10s | cooling device,           | 15  | support frame,          |
| 16  | rack,                     | 17  | first connecting member,|
| 18  | second connecting member, | 81  | first end,              |
| 82  | second end.               |     |                         |

DETAILED DESCRIPTION OF THE EMBODIMENTS

Embodiments of the present application are described in detail with reference to the accompanying drawings. Examples of the embodiments are illustrated in the drawings, where same reference numerals represent same components.

A compound vibration suppression solution combining a tuned mass damper (TMD) and a tuned liquid damper (TLD) is provided according to the embodiments of the present application, which solves the problem of attenuation of damping force of a permanent magnet eddy current damping device due to temperature rise. The embodiments of the present application will be described in detail below.

Figure 1:
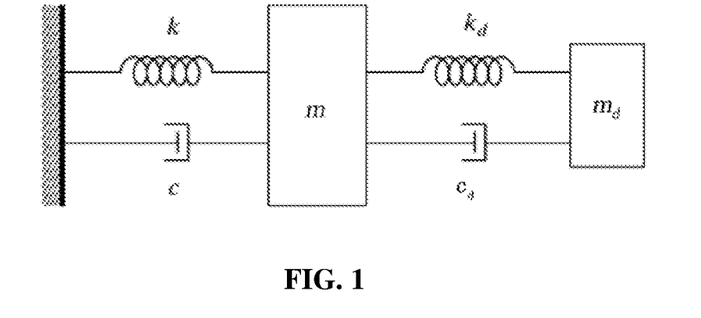
FIG. 1 is a schematic view showing a physical model of a tuned mass damper.

Generally, the tuned mass damper is used to suppress vibration, and FIG. 1 is a schematic view showing a physical model of the tuned mass damper. As shown in FIG. 1, m, k and c represent the mass, stiffness, and damping of a main structure (that is, a structure where vibration occurs, for example, a wind turbine) respectively; and $m_d$, $k_d$, and $c_d$ represent the mass, stiffness, and damping of an additional structure (that is, the tuned mass damper).

By providing the tuned mass damper and adjusting its mass ($m_d$), stiffness ($k_d$), and damping ($c_d$), in the situation that the main structure vibrates, the tuned mass damper can perform anti-phase movement with respect to the movement of the main structure, so as to absorb and dissipate the vibration energy of the main structure. That is, the process of suppressing vibration by the tuned mass damper is the process of transfer and dissipation of the vibration energy.

At present, the tuned mass damper is widely used in the construction industry, and its damping elements are basically fluid viscous damping elements. This kind of damping elements has good cost performance, but is only suitable for the application scene of the construction industry with relatively low shaking frequency and centimeter-level swing amplitude. The shaking frequency of the wind turbine is relatively high and the swing amplitude is about meter-level, so this type of damping element is not suitable to be applied to the wind turbine alone.

In view of this, a novel permanent magnet eddy current damping device is provided, and the damping characteristics thereof have the following advantages: (1) it has excellent linearity and is easy to design and adjust; (2) it has stable damping characteristics in a relatively wide temperature range; (3) there is no need of mechanical contact, it is easy to arrange, and unnecessary friction can be avoided; and (4) it can also be used in a vacuum environment, therefore, it is suitable for suppressing the vibration of the wind turbine.

However, for the permanent magnet eddy current damping device, with the increase of temperature, the magnetic field strength may attenuate to a certain extent, since the magnetic field strength corresponds to the damping force, the increase of temperature directly leads to insufficient output force or insufficient energy consumption of the permanent magnet eddy current damping device, which may directly affect the performance of vibration suppression; in addition, with the increase of temperature, the risk of demagnetization of the permanent magnet increases, which may cause the failure of the whole permanent magnet eddy current damping device.

In addition, as far as wind turbines are concerned, the application scenes of wind turbines with different capacities are different. For example, the external excitation sources corresponding to onshore units and offshore units are different, so the requirements for the effect of vibration suppression are different. Moreover, different wind turbines has different internal layouts, and the damper is generally mounted inside the tower, but the devices in the tower, such as cables, elevators, ladders and the like occupy most of the space in the tower, so the problem of mounting space is required to be considered in development of the damper.

Therefore, based on the above problems, a novel hybrid damping module is provided according to the present application. Configuration of the hybrid damping module according to the present application is specifically described hereinafter with reference to FIGS. 2 to 7.

Figure 2:
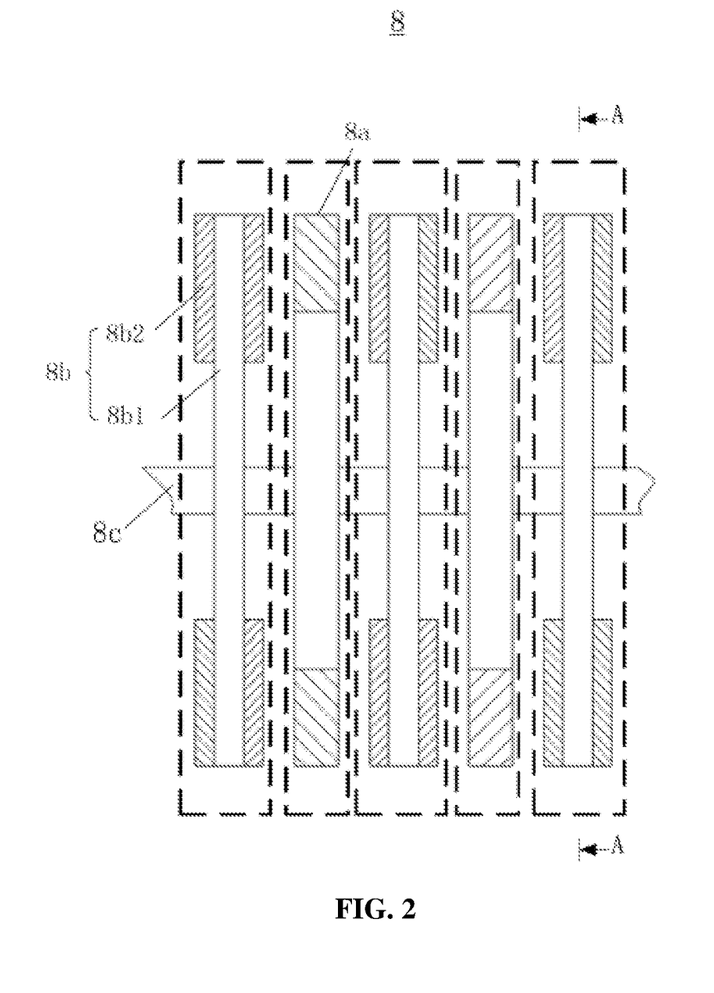
FIG. 2 is a schematic view showing a partial structure of a first damping unit of a hybrid damping module according to an embodiment of the present application.
Figure 4:
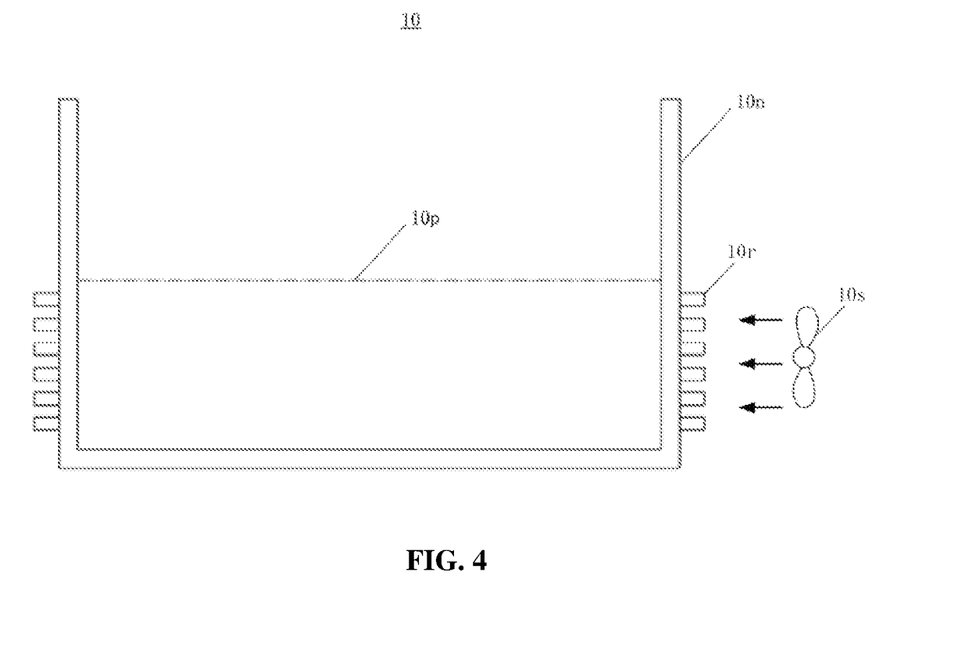
FIG. 4 is a schematic view showing a second damping unit of the hybrid damping module according to the embodiment of the present application.

The hybrid damping module according to the present application includes a first damping unit 8 (as shown in FIG. 2) and a second damping unit 10 (as shown in FIG. 4). The first damping unit 8 may be a permanent magnet eddy current damper, for example, may include a rotor portion and a stator portion arranged in parallel with the rotor portion, and the rotor portion may be configured to be rotatable relative to the stator portion, to generate electromagnetic damping. The second damping unit 10 may include a liquid damper, for example, a tuned liquid damper. Since both the permanent magnet eddy current damper and the tuned liquid damper are provided, the vibration energy generated by the main structure (such as the wind turbine) can be transferred and dissipated (which is described hereinafter) by the electromagnetic damping generated by the permanent magnet eddy current damper and the vibration of the liquid in the tuned liquid damper.

In addition, a flow passage is formed in at least one of the rotor portion and the stator portion of the first damping unit 8, the tuned liquid damper may be connected to the flow passage through a connecting pipeline 9 to form a circulation loop, and a liquid in the tuned liquid damper can circulate in the circulation loop. With the liquid circulating in the tuned liquid damper in the flow passage of the first damping unit 8, the first damping unit 8 can be cooled or dissipated, which can solve the problem of attenuation of damping force of the first damping unit 8 caused by the temperature rise, and thus ensure the output force of the first damping unit 8.

Figure 3:
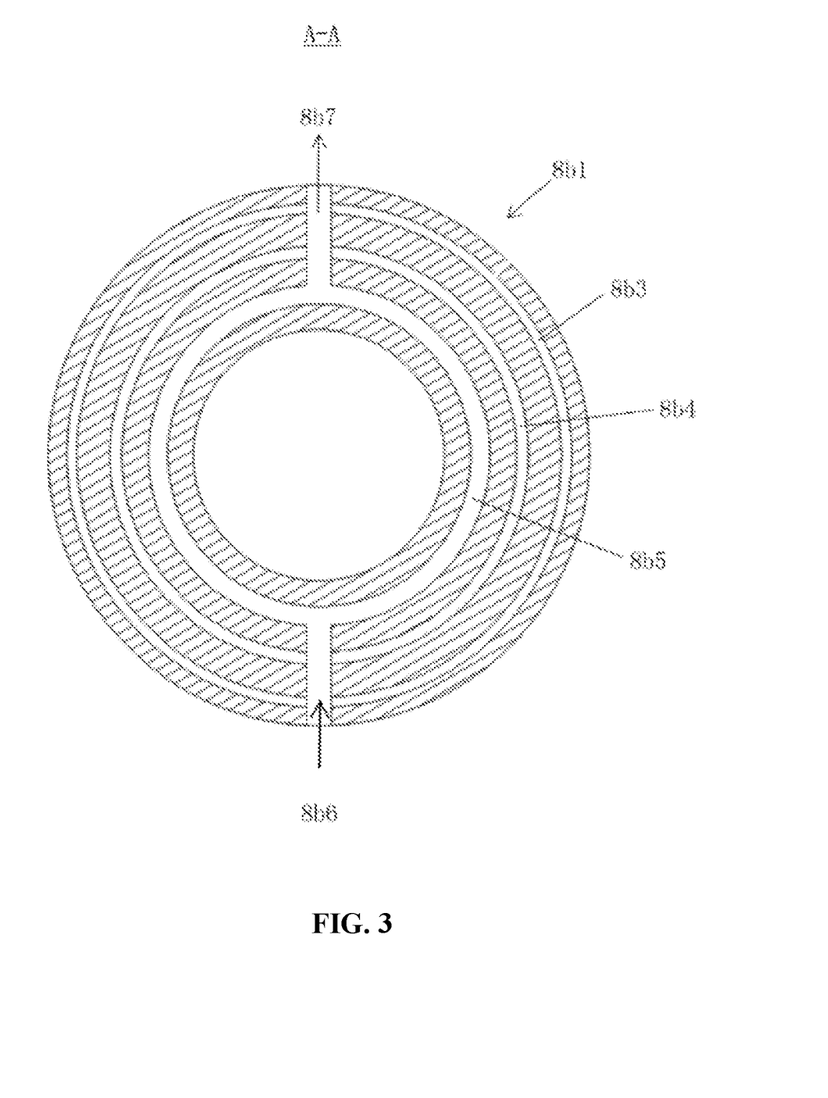
FIG. 3 is a cross-sectional view of FIG. 2 taken along line A-A.

The structure of the first damping unit is described below with reference to FIG. 2 and FIG. 3.

The first damping unit 8 may include the rotor portion 8a and the stator portion 8b arranged in parallel with the rotor portion 8a, one of the rotor portion 8a and the stator portion 8b includes a magnet, the other one of the rotor portion 8a and the stator portion 8b includes a conductor, so that electromagnetic damping is generated when the rotor portion 8a rotates relative to the stator portion 8b.

As shown in FIG. 2, multiple rotor portions 8a may be provided, and multiple stator portions 8b may be provided. The multiple rotor portions 8a and the multiple stator portions 8b may be alternately arranged in sequence along an axis of a rotating shaft 8c of the rotor portion 8a. Each rotor portion 8a may be arranged between two adjacent stator portions 8b, and the rotating shaft 8c of the rotor portion 8a passes through the stator portions 8b and is rotatable relative to the stator portions 8b. Each of the rotor portions 8a and the stator portions 8b may be formed in a disk shape.

The stator portion 8b may include a stator support disk 8b1 and a magnet 8b2 which is arranged on two surfaces of the stator support disk 8b1. The rotor portion 8a may be integrally formed as a conductor disk and faces the magnet 8b2. From the perspective of modular design, the magnet 8b2 is formed on the two surfaces of the stator support disk 8b1, but is not limited thereto. For example, the magnet 8b2 may be arranged on only one surface of the stator portion 8b which is arranged on the outermost side. The magnet 8b2 may be disk-shaped, or may include multiple magnet bars which are arranged on the surface of the stator support disk 8b1 in a radiation shape.

Although the arrangement forms of the rotor portion 8a and the stator portion 8b of the first damping unit 8 are described, the arrangement forms are not limited thereto. For example, the magnet may be arranged on the rotor portion 8a, and the corresponding conductor disk may be arranged on the stator portion 8b. That is, arrangement forms of the rotor portion 8a and the stator portion 8b may be changed according to requirements.

In addition, the flow passage may be formed in the stator portion 8b, so as to be in communication with the second damping unit 10. The flow passage may be formed in the entire stator portion 8b as much as possible, so as to increase a heat dissipation area. As an example, the flow passage may be embodied as multiple sub flow passages, as shown in FIG. 3, the multiple sub flow passages are formed in the stator support disk 8b1 of the stator portion 8b, and the multiple sub flow passages include an outer side flow passage 8b3, an intermediate flow passage 8b4 and an inner side flow passage 8b5. The outer side flow passage 8b3, the intermediate flow passage 8b4 and the inner side flow passage 8b5 are each formed in an annular shape along a circumferential direction of the stator support disk 8b1. The sub flow passages are each formed in an annular shape, which facilitates flowing of the liquid 10p, makes the cooling more uniform, and takes into account the radial distribution of the cooling capacity, which is more conducive to the cooling of the magnet 8b2. In addition, the flow passage further includes a liquid inlet 8b6 and a liquid outlet 8b7, the liquid 10p may flow into the outer side flow passage 8a3, the intermediate flow passage 8a4 and the inner side flow passage 8a5 through the liquid inlet 8b6, the liquid 10p, which has performed cooling to the magnet 8b2 and absorbed heat, flows back to the second damping unit 10 through the liquid outlet 8b7, that is, the liquid inlet 8b6 is used for the liquid with relatively low temperature to flow in, and the liquid outlet 8b7 is used for the liquid with relatively high temperature to flow out. The liquid inlet 8b6 and the liquid outlet 8b7 may be formed at positions separated from each other (for example, at two sides in a diameter direction of the stator support disk 8b1), and extend along a radial direction of the stator support disk 8b1 and are in communication with the outer side flow passage 8b3, the intermediate flow passage 8b4 and the inner side flow passage 8b5. The liquid inlet 8b6 and the liquid outlet 8b7 may be in communication with the tuned liquid damper through the connecting pipeline 9, to form a circulation loop. One liquid inlet 8b6 and one liquid outlet 8b7 are shown in the figure, thus the number of connecting ports is reduced, which improves the reliability and stability of the system and reduces failure points. Of course, multiple liquid inlets 8b6 and multiple liquid outlets 8b7 may be provided, or one liquid inlet 8b6 and multiple liquid outlets 8b7 may be provided, or multiple liquid inlets 8b6 may be integrated into one via an adapter structure and multiple liquid outlets 8b7 are integrated into one via an adapter structure.

The forms of the flow passage are merely shown above by examples, which is not limited thereto. For example, the flow passage may include a sub flow passage, a liquid inlet and a liquid outlet, the sub flow passage may be formed in a planar spiral shape, the liquid inlet is formed at a first end of the sub flow passage, the liquid outlet is formed at a second end of the sub flow passage, and both the liquid inlet and the liquid outlet are in communication with the tuned liquid damper. The flow passage which has the planar spiral shape can increase the time that the liquid 10p flows in the stator portion 8b, and thus relatively more heat can be taken away, thereby improving the cooling efficiency of the magnet 8b2. For another example, the sub flow passage may be arranged in a radiation shape according to the distribution of the magnet 8b2, so as to cool the magnet 8b2 in a targeted manner. Of course, the form of the flow passage is not limited to the above examples, as long as it is sufficient to realize the function of cooling the magnet 8b2.

In addition, in the above examples, the flow passage is formed in the stator portion 8b, which facilitates direct cooling and heat dissipation for the magnet 8b2 arranged on the stator support disk 8b1. However, the position for forming the flow passage is not limited thereto, and the flow passage may be formed in the rotor portion 8a. In the case that the flow passage is formed in the rotor portion 8a, the second damping unit 10 may be in communication with the second damping unit 10 through the connecting pipeline 9 and a liquid slip ring (a component configured for 360-degree rotation and transmission of various mediums). By providing the liquid slip ring, the connecting pipeline 9 can be prevented from rotating along with the rotor portion 8a.

The structure of the second damping unit is described hereinafter with reference to FIG. 4 and FIG. 5.

Figure 5:
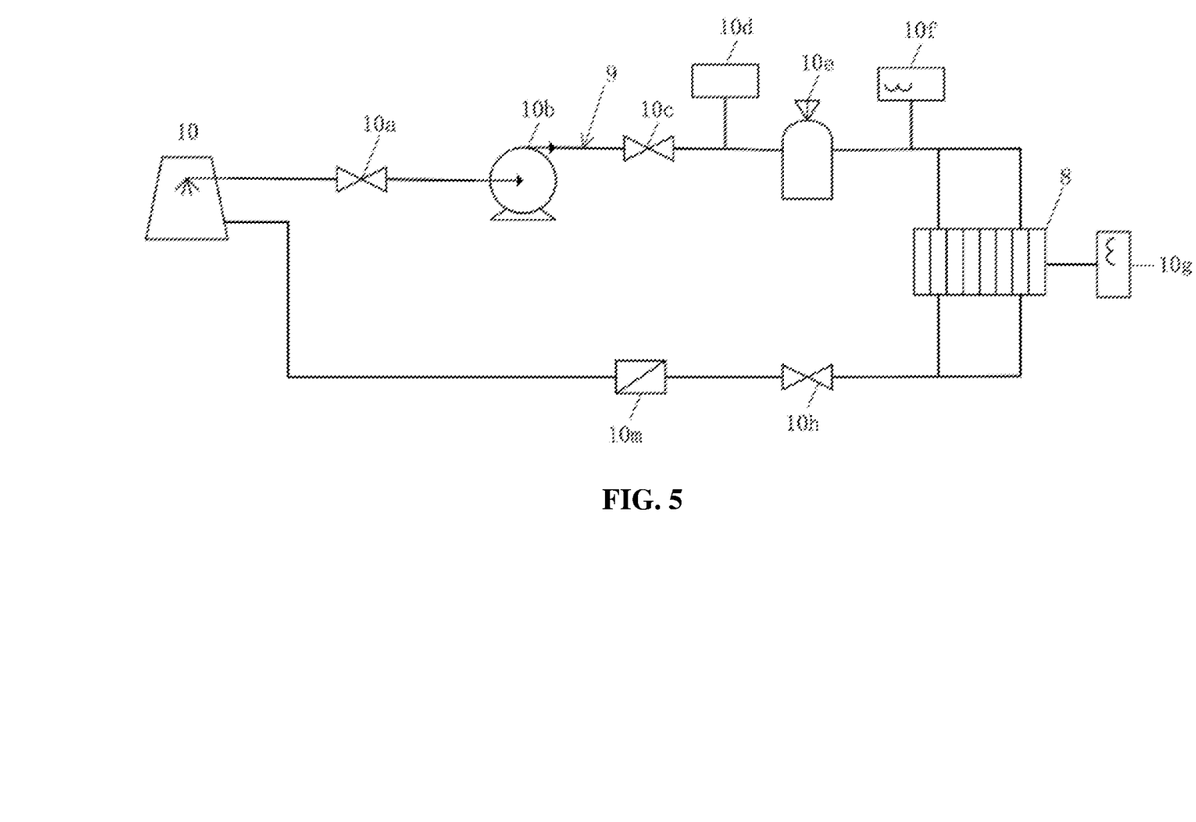
FIG. 5 is a schematic diagram of a circulation loop formed by the first damping unit and the second damping unit of the hybrid damping module according to the embodiment of the present application.

As shown in FIG. 4 and FIG. 5, the second damping unit 10 is a tuned liquid damper, and includes the liquid 10p and a container 10n for accommodating the liquid 10p. The liquid 10p may flow, under the action of a circulating pump 10b, into the outer side flow passage 8a3, the intermediate flow passage 8a4 and the inner side flow passage 8a5 of the first damping unit 8 from the liquid inlet 8b6 through a first portion of the connecting pipeline 9, the liquid 10p flowing into the first damping unit 8 absorbs the heat generated by the first damping unit 8, and the liquid 10p that has absorbed the heat flows back into the container 10n from the liquid outlet 8b7 through a second portion of the connecting pipeline 9, so as to dissipate heat for the first damping unit 8 once. Optionally, in order to reduce the power consumption of the circulating pump 10b, the first damping unit 8 may be arranged below the tuned liquid damper in a vertical direction of the main structure to be vibration-suppressed, so that a height difference is formed, and thus the liquid 10p can flow into the first damping unit 8 easily.

Since the magnet 8b2 is arranged on the two surfaces of the stator portion 8b of the first damping unit 8 and the flow passage is formed in the stator portion 8b, the liquid 10p can directly dissipate heat for the magnet 8b2, which reduces the attenuation of the magnetic field strength of the magnet 8b2 due to temperature rise, and thereby reducing the risk of demagnetization of the magnet 8b2. Preferably, in order to further improve the heat dissipation effect, heat dissipation fins 10r may be arranged on an outer surface of the container 10n, to dissipate heat of the liquid 10p that has absorbed heat. Further, a cooling device 10s (for example, a cooling fan, a water-cooled device or other similar cooling devices) may be provided outside the container 10n, and the cooling device 10s is arranged around the heat dissipation fins 10r for cooling the heat dissipation fins 10r. In addition, a heat-absorbing material layer or heat dissipation fins may be provided on the stator portion 8b, the heat-absorbing material layer or the heat dissipation fins can dissipate heat for the magnet 8b2 by absorbing the heat generated by the magnet 8b2 and exchanging heat with the external air when the temperature of the magnet 8b2 is relatively low. Therefore, the frequent start and stop of the circulating pump 10b can be reduced, and thus the energy can be saved while the heat dissipation effect is realized. Of course, the heat-absorbing material layer may be further arranged (coated) on the flow passage, so as to absorb the heat generated by the magnet 8b2 quickly and efficiently, and then the heat is taken away via the liquid 10p in the circulation loop.

Further, as shown in FIG. 5, a first temperature sensor 10f may be arranged at a side, where the liquid inlet is located, of the first damping unit 8, for measuring a temperature value of the liquid 10p before entering the first damping unit 8. The first damping unit 8 may be provided with a second temperature sensor 10g, for measuring a current temperature value of the first damping unit 8. In addition, a pressure sensor 10d and a buffer tank 10e may be provided at the side, where the liquid inlet is located, of the first damping unit 8, for measuring and adjusting a pressure of the liquid 10p. A filter 10m may be provided on a side, where the liquid outlet is located, of the first damping unit 8, for filtering impurities in the liquid 10p, so as to avoid blockage of the pipeline. Furthermore, in order to facilitate the control of the entire circulation loop, multiple on-off valves may be provided in the connecting pipeline 9, for example, a first valve 10a is arranged between the second damping unit 10 and the circulating pump 10b, a second valve 10c is arranged between the circulating pump 10b and the pressure sensor 10d, and a third valve 10h is arranged between the filter 10m and the liquid outlet 8b7 of the first damping unit 8. Of course, the number and position of valves are not limited thereto, which can be designed according to actual needs.

In order to avoid the problem of the weakening of the vibration suppression effect caused by the decrease of the damping force due to the temperature rise caused by the excessive load of the hybrid damping module due to long-term operation or excessive excitation, the temperature of the hybrid damping module needs to be adjust properly. To this end, the hybrid damping module further includes a controller, and the controller controls whether the liquid 10p flows through the first damping unit 8 based on the current temperature value of the first damping unit 8 measured by the second temperature sensor 10g. Specifically, in a case that the temperature of the first damping unit 8 is less than or equal to a first temperature threshold, the controller controls the circulating pump 10b to turn off, and the liquid 10p is not allowed to flow through the first damping unit 8, in this case, the first damping unit 8 can dissipate heat through the external air by itself; in a case that the temperature of the first damping unit 8 is greater than the first temperature threshold, the controller controls the circulating pump 10b to turn on, to allow the liquid 10p to flow through the first damping unit 8, so as to dissipate heat for the first damping unit 8. In addition, the controller can further adjust a flow rate of the liquid 10p based on the current temperature value of the first damping unit 8, so as to save energy while effectively dissipating heat for the first damping unit 8. For example, the higher the current temperature value of the first damping unit 8 is, the greater the flow rate of the liquid 10p circulating in the circulation loop is; and the lower the current temperature value of the first damping unit 8 is, the smaller the flow rate of the liquid 10p circulating in the circulation loop is.

As an example, a state that the current temperature value of the first damping unit 8 is greater than the first temperature threshold can be simply divided into an over-temperature state (also referred to as a first abnormal temperature state) of the current temperature value of the first damping unit Band a high-temperature state (also referred to as a second abnormal temperature state) of the current temperature value of the first damping unit 8. Herein, the over-temperature state includes that the current temperature value of the first damping unit 8 is greater than the first temperature threshold and less than the second temperature threshold, and the high-temperature state includes that the current temperature value of the first damping unit 8 is greater than or equal to the second temperature threshold.

In a case that the current temperature value of the first damping unit 8 is in the over-temperature state (that is, greater than the first temperature threshold and less than the second temperature threshold), the controller controls the circulating pump 10b to operate at half load, to allow the liquid 10p to flow in the circulation loop at a first flow rate. In a case that the current temperature value of the first damping unit 8 is in the high-temperature state (that is, greater than or equal to the second temperature threshold), the controller controls the circulating pump 10b to operate at full load, to allow the liquid 10p to flow in the circulation loop at a second flow rate greater than the first flow rate. Preferably, in order to improve the heat dissipation efficiency, in the case that the current temperature value of the first damping unit 8 is in the high-temperature state (that is, greater than or equal to the second temperature threshold), the controller controls the cooling device 10s (such as a cooling fan) to operate, so as to cool the liquid 10p.

In addition, in order to better perform temperature control based on the excessive temperature rise process, the controller is configured to be able to determine a duration of the current temperature value of the first damping unit 8 being in the over-temperature state, and allow the liquid 10p to flow in the circulation loop at the first flow rate in a case that the duration of the over-temperature state is less than a first time threshold. In a case that the duration of the over-temperature state is greater than the first time threshold, that is, the current temperature value of the first damping unit 8 is still in the over-temperature state, in order to improve the heat dissipation efficiency, the controller may control the circulating pump 10b to operate at full load, to allow the liquid 10p to flow in the circulation loop at the second flow rate. In a case that the controller directly determines that the current temperature value of the first damping unit 8 is in the high-temperature state, the controller directly controls the circulating pump 10b to operate at full load, to allow the liquid 10p to flow in the circulation loop at the second flow rate. In addition, in order to improve the accuracy of temperature measurement, the temperature value of the first damping unit 8 may be measured within a predetermined period of time, to determine the temperature state of the first damping unit 8 more accurately, so as to avoid unnecessary motions of the circulating pump 10b due to instability of the temperature value of the first damping unit 8.

Hence, based on the above description of the temperature adjustment of the hybrid damping module, a vibration suppression method using the hybrid damping module is further provided according to the present application. The vibration suppression method using the hybrid damping module is described in detail hereinafter with reference to FIG. 6.

Figure 6:
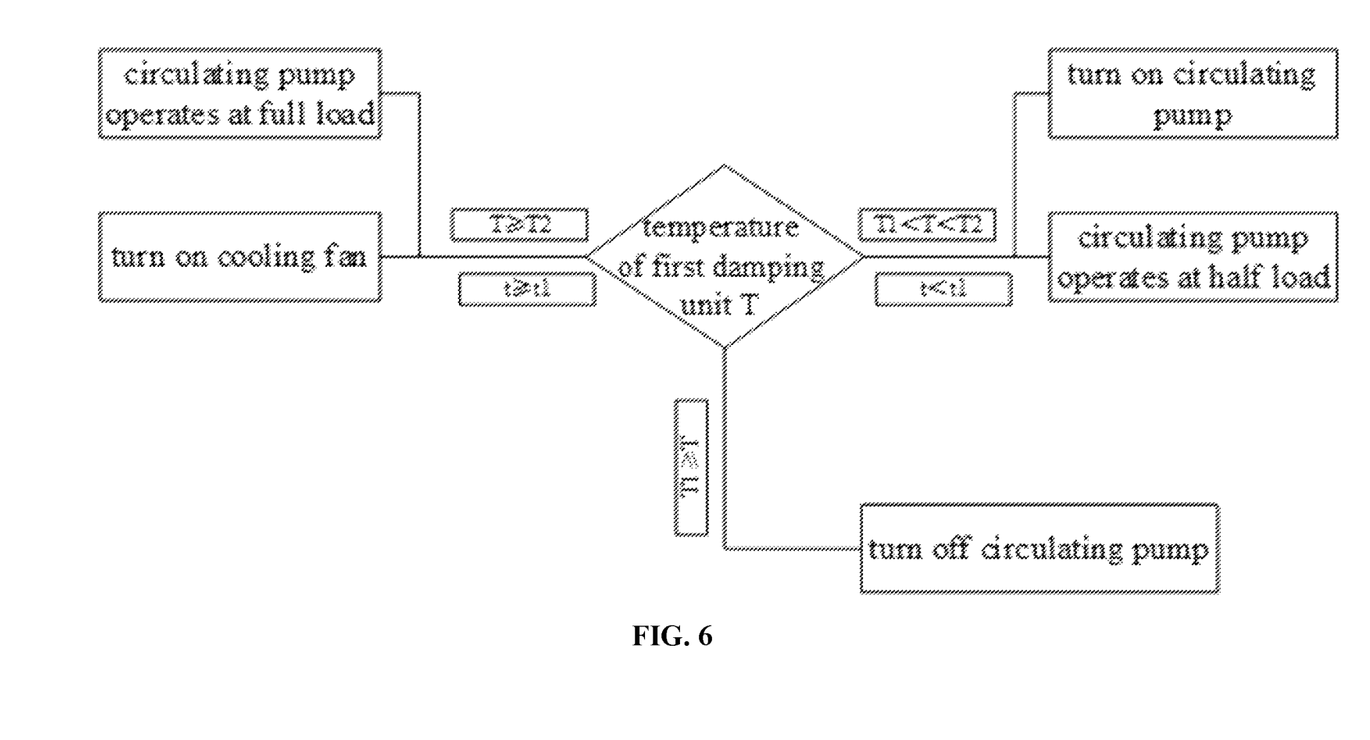
FIG. 6 is a control logic diagram for vibration suppression by using the hybrid damping module according to the embodiment of the present application.

The method includes measuring a current temperature value T of the first damping unit 8, and controlling the liquid 10p to circulate in the circulation loop in a case that the measured current temperature value T of the first damping unit 8 is greater than a first temperature threshold T1.

Specifically, in a case that the measured current temperature value T of the first damping unit 8 is greater than the first temperature threshold T1 and less than a second temperature threshold T2 (that is, in an over-temperature state), the liquid 10p is controlled to circulate in the circulation loop at a first flow rate; in a case that the current temperature value T of the first damping unit 8 is greater than or equal to the second temperature threshold T2 (that is, in a high-temperature state), the liquid 10p is controlled to circulate in the circulation loop at a second flow rate greater than the first flow rate, and a cooling device 10s (such as a cooling fan) is controlled to operate for cooling the liquid 10p. Furthermore, the method further includes: determining a duration t of the current temperature value of the first damping unit 8 being in the over-temperature state; controlling the circulating pump 10b to operate at half load in a case that the duration t of the over-temperature state is less than a first time threshold t1, to allow the liquid 10p to circulate in the circulation loop at the first flow rate; controlling the circulating pump 10b to operate at full load in a case that the duration t of the over-temperature state is greater than or equal to the first time threshold t1, to allow the liquid 10p to circulate in the circulation loop at the second flow rate greater than the first flow rate, to accelerate heat dissipation.

Optionally, considering the instability of the temperature value of the first damping unit 8, the cooling device 10s may be controlled to operate for cooling the liquid 10p after the high-temperature state lasts for a predetermined time.

The temperature adjustment of the hybrid damping module is described by examples, but is not limited thereto. The current temperature value of the first damping unit 8 is not limited to be divided into two states (that is, the over-temperature state and the high-temperature state). For accurate temperature control, the current temperature value of the first damping unit 8 can be further divided in detail. For example, it can be divided into three states or more, and the flow rate of the liquid 10p can be finely adjusted based on the state of the current temperature value of the first damping unit 8, so as to achieve the energy saving effect.

As described above, the flowing of the liquid 10p is controlled according to the temperature state of the current temperature value of the first damping unit 8, which can realize energy saving while effectively dissipating heat for the first damping unit 8 is realized. Therefore, decrease of the damping force of the hybrid damping module due to excessive temperature can be avoided, thereby ensuring the vibration suppression effect of the hybrid damping module. In addition, the heat of the first damping unit 8 is dissipated through the liquid 10p in the tuned liquid damper, which can solve the problems of complex structure and high cost caused by arranging additional cooling devices for the first damping unit 8, realize the interaction and coordination between the permanent magnet eddy current damping device and the tuned liquid damper, and fully utilize the advantageous characteristics of the two types of dampers. At the same time of realizing synergistic and compound vibration suppression by combining the TMD and the TLD, the working performance of the TMD is optimized and enhanced by using the TLD, and thus the demagnetization or the attenuation of damping force of the permanent magnet eddy current damper caused by over temperature is avoided.

The structure of the hybrid damping module and the suppressing vibration method using the hybrid damping module are described hereinabove. The principle of suppressing vibration by using the hybrid damping module is described in detail hereinafter by taking the case that the hybrid damping module is applied to a wind turbine as an example.

Figure 7:
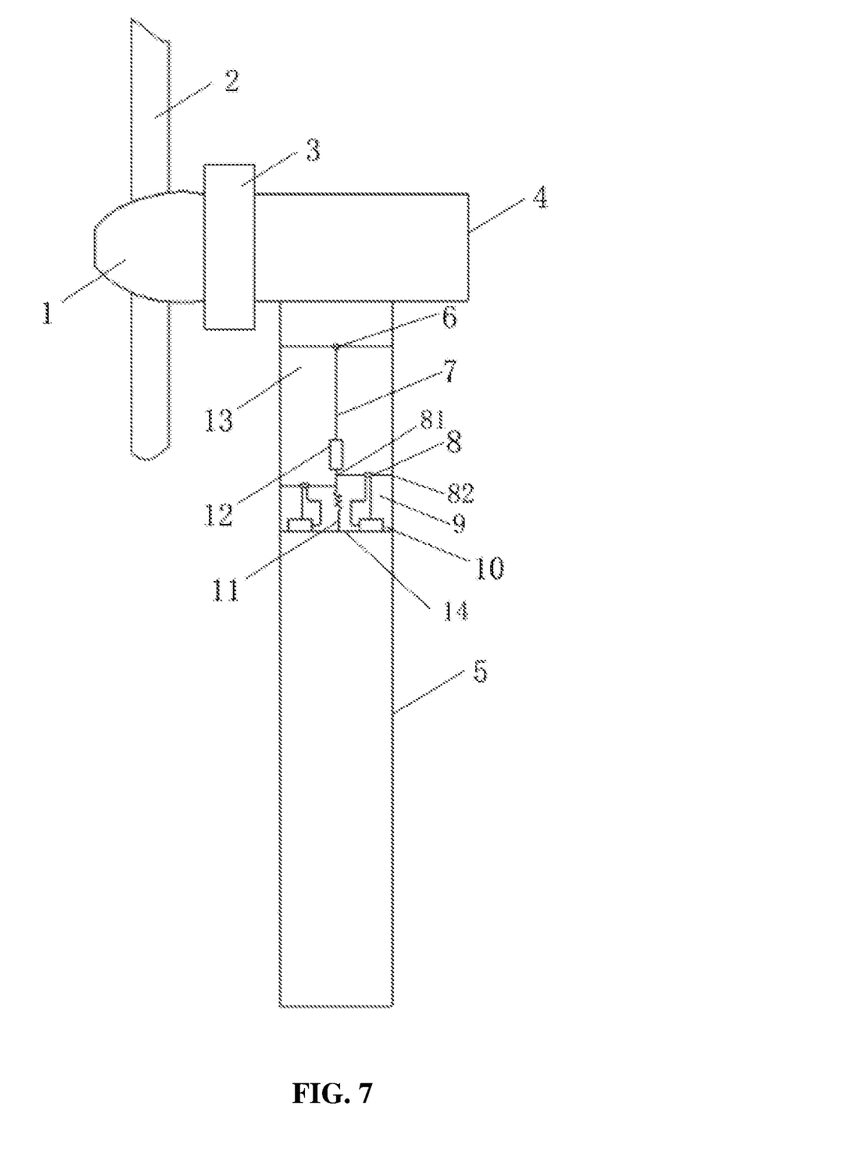
FIG. 7 is a schematic view showing the vibration suppression device according to the embodiment of the present application being applied to a wind turbine.

As shown in FIG. 7, the wind turbine includes a hub 1, a blade 2, a generator 3, a nacelle 4 and a tower 5. The first damping unit 8 may be arranged inside the tower 5 of the wind turbine, for example, a first end 81 of the first damping unit 8 is connected to a mass block 12, and a second end of the first damping unit 8 is connected to an inner wall of the tower 5. The mass block 12 is connected to a suspension device 6 mounted on a suspension platform 13 through a swing rod 7, so that when the wind turbine vibrates, the swing rod 7 can drive the mass block 12 to perform simple pendulum movement which is anti-phase with respect to the vibration of the wind turbine, so that the kinetic energy of the simple pendulum movement of the mass block 12 can be dissipated by the first damping unit 8, thereby suppressing the vibration.

The first damping unit 8, the second damping unit 10, the suspension device 6, the swing rod 7 and the mass block 12 may be collectively referred to as a vibration suppression device. Optionally, the vibration suppression device further includes a frequency modulation assembly which may be connected to the mass block 12 and the first damping unit 8. For example, the frequency modulation assembly may include an elastic member 11 and a frequency modulation platform 14, a first end of the elastic member 11 is connected to the mass block 12 to be further connected to the first damping unit 8, and a second end of the elastic member 11 is connected to the frequency modulation platform 14 fixed to the inner wall of the tower 5. In addition, the vibration suppression device may include multiple first damping units 8 and multiple second damping units 10, the multiple first damping units 8 may be evenly distributed along an axial direction of the tower 5, and may be spaced apart at a predetermined angle in a radial direction of the tower 5; correspondingly, the multiple second damping units 10 may be spaced apart at the predetermined angle in the radial direction of the tower 5 and are in communication with the first damping units 8. In addition, the second damping unit 10 may be arranged on the frequency modulation platform 14. Optionally, as described above, the second damping units 10 may be arranged above the first damping units 8, so as to reduce the power consumption of the circulating pump 10b.

The principle of vibration suppression of the vibration suppression device is described in detail hereinafter.

Figure 8:
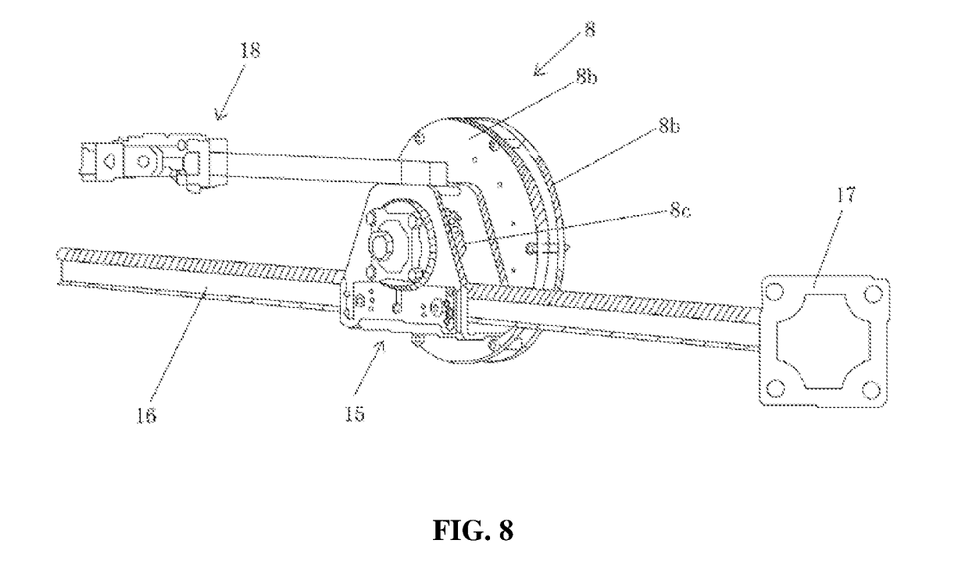
FIG. 8 is a schematic view showing the structure of the first damping unit according to the embodiment of the present application.

The kinetic energy of the simple pendulum movement of the mass block 12 is dissipated by the first damping unit 8 via a gear and rack. Referring to FIG. 8, one stator portion 8b of the first damping unit 8 is fixed on an outer side of a support frame 15 and is fixedly connected to another stator portion 8b. A rotating shaft 8c of the rotor portion 8a is inserted into the support frame 15 from the outer side of the support frame 15 and is formed to be a gear structure, a rack 16 that engages with the rotating shaft 8c is provided in the support frame 15, and one end of the rack 16 is mounted on the inner wall of the tower 15 through a first connecting member 17. The mass block 12 is connected to the support frame 15 through a second connecting member 18. Hence, when the mass block 12 swings, the mass block 12 can drive the support frame 15 to move linearly on the rack 16 through the engagement between the rotating shaft 8c and the rack 16. Moreover, as the support frame 15 moves on the rack 16, the rotor portion 8a can rotate relative to the stator portion 8b, so that the rotor portion 8a formed as a conductor disk can cut the magnetic induction lines to generate an induced electromotive force. In a case that an external circuit of the rotor portion 8a is closed, induced current is generated, and the magnetic field may generate an ampere force on the induced current, forming a couple moment opposite to the original rotation direction of the rotor portion 8a, which plays a damping role to the rotation of the rotor portion 8a. Since the rotor portion 8a and the stator portion 8b are disc-shaped, the annular induced current is generated due to electromagnetic induction when the rotor portion 8a rotates relative to the stator portion 8b, thus forming eddy current, so as to generate a damping force between the rotor portion 8a and the stator portion, which can dissipate the kinetic energy of the simple pendulum movement of the mass block 12. The above example is only an implementation form of energy transfer, which is not limited thereto. For example, the energy transfer may also be realized by means of a ball screw, a toothed belt, etc., the principle of which is similar to the above description, which will not be described herein.

In addition, when the wind turbine vibrates, the movement of the liquid 10p in the tuned liquid damper is anti-phase with respect to the vibration of the wind turbine, the liquid 10p hits against the inner wall of the container 10n and moves up and down along the inner wall, and the liquid 10p generates heat during the movement, thus the tuned liquid damper converts the vibration energy of the wind turbine into kinetic energy and thermal energy, so that the vibration energy of the wind turbine is dissipated and the vibration of the wind turbine is suppressed.

In the hybrid damping module according to the present application, the vibration suppression effect of the hybrid damping module is improved by the combination use of the first damping unit and the second damping unit. In addition, in the hybrid damping module according to the embodiments of the present application, the cooling flow passage is configured in the first damping unit, and the connecting pipeline is constructed between the first damping unit and the second damping unit, so that the damping liquid in the second damping unit flows through the cooling flow passage of the first damping unit as a circulating cooling medium, and the flow rate of the damping liquid is dynamically adjusted according to the real-time temperature of the first damping unit, so as to realize the automatic, efficient and energy-saving cooling and heat dissipation for the second damping unit, which solves the problems of demagnetization and the attenuation of damping force of the first damping unit caused by the temperature rise. In addition, the technical solutions can solve the problems of complex structure and high cost caused by arranging the additional cooling device for the permanent magnet eddy current damping device, realize the interaction and coordination between the permanent magnet eddy current damping device and the tuned liquid damper, fully utilize the advantageous characteristics of the two types of dampers. At the same time of realizing synergistic and compound vibration suppression by combining the TMD and the TLD, the working performance of the TMD is optimized and enhanced by using the TLD, and thus the demagnetization or the attenuation of damping force of the permanent magnet eddy current damper caused by over temperature is avoided.

In addition, the vibration suppression device according to the embodiments of the present application has the same above effects, which is not described herein.

In addition, the wind turbine is provided according to the embodiments of the present application, which includes the vibration suppression device and the tower, and has the same above effects, which is not described herein.

Although the embodiments of the present application have been described above in detail, various modifications and variations can be made to the embodiments of the present application by those skilled in the art without departing from the spirit and scope of the present application. It should be understood by those skilled in the art that such modifications and variations still fall within the spirit and scope of the embodiments of the present application as defined by the claims.

The invention claimed is:

1. A hybrid damping module configured to suppress vibration of a wind turbine, comprising a first damping unit, a second damping unit, and a connecting pipeline provided between the first damping unit and the second damping unit, wherein the first damping unit is a permanent magnet eddy current damper comprising a rotor portion and a stator portion arranged in parallel with the rotor portion, the rotor portion is configured to be rotatable relative to the stator portion to generate electromagnetic damping, and a flow passage is embedded in at least one of the rotor portion and the stator portion; and the second damping unit comprises a tuned liquid damper, the tuned liquid damper is in communication with the flow passage via the connecting pipeline to form a circulation loop, and a liquid in the tuned liquid damper is configured to circulate in the circulation loop, to directly cool the first damping unit.

2. The hybrid damping module according to claim 1, wherein one of the rotor portion and the stator portion comprises a magnet, and the other one of the rotor portion and the stator portion comprises a conductor, to allow the electromagnetic damping to be generated when the rotor portion rotates relative to the stator portion.

3. The hybrid damping module according to claim 2, wherein the stator portion comprises the magnet, and the flow passage is formed in the stator portion.

4. The hybrid damping module according to claim 2, wherein the flow passage comprises:
   a plurality of sub flow passages comprising an outer side flow passage, an intermediate flow passage and an inner side flow passage, wherein each of the plurality of sub flow passages are formed in an annular shape along a circumferential direction of the at least one of the rotor portion and the stator portion; and
   a liquid inlet and a liquid outlet, wherein each of the liquid inlet and the liquid outlet extends along a radial direction of the at least one of the rotor portion and the stator portion and is in communication with the plurality of sub flow passages, and both the liquid inlet and the liquid outlet are in communication with the tuned liquid damper through the connecting pipeline, to form the circulation loop.

5. The hybrid damping module according to claim 2, wherein the flow passage comprises:
   a sub flow passage, wherein the sub flow passage is formed in the at least one of the rotor portion and the stator portion in a planar spiral shape; and
   a liquid inlet and a liquid outlet, wherein the liquid inlet is formed at a first end of the sub flow passage, the liquid outlet is formed at a second end of the sub flow passage, and both the liquid inlet and the liquid outlet are in communication with the tuned liquid damper through the connecting pipeline, to form the circulation loop.

6. The hybrid damping module according to claim 1, wherein the tuned liquid damper is arranged above the first damping unit.

7. The hybrid damping module according to claim 4, wherein a first temperature sensor is arranged at a side where the liquid inlet is located, which is configured for measuring a current temperature value of the liquid; and/or,
   a second temperature sensor is arranged at the first damping unit, which is configured for measuring a current temperature value of the first damping unit; and/or,
   a pressure sensor and/or a buffer tank is arranged at the side where the liquid inlet is located; and/or,
   a filter is arranged at a side where the liquid outlet is located.

8. The hybrid damping module according to claim 7, wherein the tuned liquid damper comprises a container for accommodating the liquid, heat dissipation fins and/or a cooling device; wherein
   the heat dissipation fins are arranged on an outer surface of the container, and the cooling device is arranged around the heat dissipation fins for cooling the heat dissipation fins.

9. The hybrid damping module according to claim 8, further comprising a controller, wherein the controller is configured to control the liquid to circulate in the circulation loop in a case that the current temperature value of the first damping unit is determined to be greater than a first temperature threshold.

10. The hybrid damping module according to claim 9, wherein the controller is further configured to adjust a flow rate of the liquid circulating in the circulation loop based on the current temperature value of the first damping unit; wherein
    the greater the current temperature value of the first damping unit is, the higher the flow rate of the liquid circulating in the circulation loop is; and the smaller the current temperature value of the first damping unit is, the lower the flow rate of the liquid circulating in the circulation loop is.

11. The hybrid damping module according to claim 10, wherein the controller is further configured to:
    control the liquid to circulate in the circulation loop at a first flow rate in a case that the current temperature value of the first damping unit is determined to be in a first abnormal temperature state;
    control the liquid to circulate in the circulation loop at a second flow rate in a case that the current temperature value of the first damping unit is determined to be in a second abnormal temperature state; wherein
    the second flow rate is greater than the first flow rate; the first abnormal temperature state comprises that the current temperature value of the first damping unit is greater than the first temperature threshold and is less than a second temperature threshold; and the second abnormal temperature state comprises that the current temperature value of the first damping unit is greater than or equal to the second temperature threshold.

12. The hybrid damping module according to claim 11, wherein the controller is further configured to control the cooling device to operate in the case that the current temperature value of the first damping unit is determined to be in the second abnormal temperature state.

13. The hybrid damping module according to claim 11, wherein the controller is further configured to determine a duration of the current temperature value of the first damping unit being in the first abnormal temperature state; wherein
    in a case that the duration of the first abnormal temperature state is determined to be less than a first time threshold, the liquid is controlled to circulate in the circulation loop at the first flow rate; and
    in a case that the duration of the first abnormal temperature state is determined to be greater than or equal to the first time threshold, the liquid is controlled to circulate in the circulation loop at the second flow rate.

14. A vibration suppression device, comprising the hybrid damping module according to claim 1, a suspension device, a swing rod and a mass block, wherein
    the mass block is connected to the suspension device through the swing rod, to allow the swing rod to drive the mass block to swing, a first end of the hybrid damping module is connected to the mass block, and a second end of the hybrid damping module is connected to a vibration device to be vibration-suppressed.

15. The vibration suppression device according to claim 14, wherein the vibration suppression device further comprises a frequency modulation assembly configured to adjust a frequency of the vibration suppression device, and the frequency modulation assembly comprises an elastic member and a frequency modulation platform fixed to the vibration device to be vibration-suppressed; wherein a first end of the elastic member is connected to the mass block, and a second end of the elastic member is connected to the frequency modulation platform.

16. A wind turbine, comprising the vibration suppression device according to claim 14 and a tower, wherein
the vibration suppression device is arranged in the tower, and the second end of the hybrid damping module is connected to an inner wall of the tower.

17. A vibration suppression method, using the hybrid damping module according to claim 1, wherein the method comprises:
measuring a current temperature value of the first damping unit; and
controlling the liquid to circulate in the circulation loop in a case that the measured current temperature value of the first damping unit is greater than a first temperature threshold.

18. The method according to claim 17, further comprising adjusting a flow rate of the liquid circulating in the circulation loop based on the current temperature value of the first damping unit; wherein
the greater the current temperature value of the first damping unit is, the higher the flow rate of the liquid circulating in the circulation loop is; and the smaller the current temperature value of the first damping unit is, the lower the flow rate of the liquid circulating in the circulation loop is.

19. The method according to claim 17, further comprising:
controlling the liquid to circulate in the circulation loop at a first flow rate in a case that the measured current temperature value of the first damping unit is in a first abnormal temperature state; and
controlling the liquid to circulate in the circulation loop at a second flow rate in a case that the measured current temperature value of the first damping unit is in a second abnormal temperature state; and wherein
the second flow rate is greater than the first flow rate; the first abnormal temperature state comprises that the current temperature value of the first damping unit is greater than the first temperature threshold and is less than a second temperature threshold; and the second abnormal temperature state comprises that the current temperature value of the first damping unit is greater than or equal to the second temperature threshold.

20. The method according to claim 19, further comprising:
controlling a cooling device which is arranged outside the tuned liquid damper to operate in a case that the measured current temperature value of the first damping unit is in the second abnormal temperature state, to cool the liquid.

* * * * *